US011148788B2

(12) United States Patent
Swanson

(10) Patent No.: US 11,148,788 B2
(45) Date of Patent: Oct. 19, 2021

(54) CURVED WINGTIP FOR AIRCRAFT

(71) Applicant: Textron Aviation Inc., Wichita, KS (US)

(72) Inventor: David James Swanson, Maize, KS (US)

(73) Assignee: Textron Innovation, Inc., Providence, RI (US)

( * ) Notice: Subject to any disclaimer, the term of this patent is extended or adjusted under 35 U.S.C. 154(b) by 715 days.

(21) Appl. No.: 15/430,661

(22) Filed: Feb. 13, 2017

(65) Prior Publication Data

US 2017/0233065 A1    Aug. 17, 2017

Related U.S. Application Data

(60) Provisional application No. 62/294,570, filed on Feb. 12, 2016.

(51) Int. Cl.
*B64C 23/06* (2006.01)

(52) U.S. Cl.
CPC ............. *B64C 23/069* (2017.05); *Y02T 50/10* (2013.01)

(58) Field of Classification Search
CPC ............................ B64C 23/069; B64C 23/065
See application file for complete search history.

(56) References Cited

U.S. PATENT DOCUMENTS

| | | | | |
|---|---|---|---|---|
| 4,477,042 A * | 10/1984 | Griswold, II | ......... | B64C 23/065 244/199.2 |
| 5,039,032 A * | 8/1991 | Rudolph | ............... | B64C 23/069 244/35 R |
| 5,102,068 A | 4/1992 | Gratzer | | |
| 5,348,253 A | 9/1994 | Gratzer | | |
| 6,089,502 A * | 7/2000 | Herrick | ..................... | B64C 3/10 244/35 R |
| 6,484,968 B2 | 11/2002 | Felker | | |
| 7,971,832 B2 * | 7/2011 | Hackett | ................. | B64C 23/069 244/199.4 |
| 8,336,830 B2 * | 12/2012 | Eberhardt | ................. | B64C 3/54 244/218 |
| 8,708,286 B2 * | 4/2014 | Sakurai | ..................... | B64C 3/56 244/201 |
| 9,302,766 B2 * | 4/2016 | Gratzer | ................. | B64C 23/069 |
| 9,499,252 B2 * | 11/2016 | Lassen | ..................... | B64C 3/56 |
| 9,914,523 B2 * | 3/2018 | Good | ......................... | B64C 3/56 |
| 10,005,546 B2 * | 6/2018 | Gratzer | ................. | B64C 23/069 |
| 10,252,793 B2 * | 4/2019 | Gratzer | ................. | B64C 23/065 |
| 10,370,084 B2 * | 8/2019 | Cline | ......................... | B64C 3/56 |

(Continued)

*Primary Examiner* — Philip J Bonzell
(74) *Attorney, Agent, or Firm* — Erise IP, P.A.

(57) ABSTRACT

Embodiments of the present disclosure include a curved planar wingtip for a straight wing and a curved planar wingtip for a swept wing of an aircraft. The curved planar wingtips include a member that extends from the end of the wing in a direction aft of the wing trailing edge while remaining substantially planar with the wing. The curved planar wingtips curve continuously from leading and trailing edges of the wing to form a tip located aft of the wing. Other embodiments of the curved planar wingtip are configured for a horizontal or vertical tail. Yet another embodiment includes a curved wingtip that extends aft of a trailing edge of the wing by a distance greater than the curved wingtip extends above a top surface of the wing.

14 Claims, 9 Drawing Sheets

(56) References Cited

U.S. PATENT DOCUMENTS

| | | | |
|---|---|---|---|
| 2002/0162917 A1* | 11/2002 | Heller | B64C 3/10 |
| | | | 244/199.4 |
| 2007/0252031 A1* | 11/2007 | Hackett | B64C 27/463 |
| | | | 244/4 R |
| 2009/0084904 A1* | 4/2009 | Detert | B64C 23/065 |
| | | | 244/199.4 |
| 2010/0294891 A1* | 11/2010 | Kelm | B64C 23/069 |
| | | | 244/199.4 |
| 2011/0192937 A1 | 8/2011 | Buescher et al. | |
| 2013/0099060 A1* | 4/2013 | Dees | B64C 3/56 |
| | | | 244/199.4 |
| 2014/0117150 A1* | 5/2014 | Good | B64C 3/56 |
| | | | 244/49 |
| 2014/0346281 A1* | 11/2014 | Gratzer | B64C 23/069 |
| | | | 244/199.4 |
| 2015/0014478 A1* | 1/2015 | Lassen | B64C 3/56 |
| | | | 244/49 |
| 2016/0214706 A1* | 7/2016 | Gratzer | B64C 23/065 |

* cited by examiner

CURVED WINGTIP FOR AIRCRAFT

CROSS-REFERENCE TO RELATED APPLICATIONS

This application claims priority of U.S. Provisional Patent Application No. 62/294,570, filed Feb. 12, 2016, which is incorporated herein by reference.

BACKGROUND

Aircraft wings generate lift and control aircraft maneuvers during flight. Lift is generated by higher air pressure underneath a wing compared to above the wing. This higher pressure air has a tendency to roll from underneath the wing around the wing tip towards the upper wing surface, thereby generating a trailing wing tip vortex that reduces wing efficiency. Modifications to wing tips in the form of winglets or wing tip planforms have been employed for many years to displace this wing tip vortex and improve wing efficiency. However, many types of winglet and wing tip planforms are inefficient themselves and may add additional loads to the wing, for example due to cross winds, which the wing may not be designed to withstand.

1. Field

Embodiments of the present disclosure relate generally to an extension of the end or tip of an aircraft wing, and more specifically to an extension that curves aft of the aircraft wing but does not substantially curve upward to form a winglet.

2. Description of the Related Art

Many different wing-tip configurations have been employed on aircraft for the purpose of affecting the aerodynamics of the aircraft. One example is that of a winglet, which is either an add-on feature or incorporated into the existing wing structure. Winglets typically curve up dramatically in order to meet the desired aerodynamics. Other examples exist. For example, U.S. Patent Publication No. 2011/0192937 to Buescher et al. discloses a non-planar wing tip device for aircraft wings that is curved relative to the wing.

SUMMARY

According to one embodiment, a curved planar wingtip for a wing of an aircraft is provided. The curved planar wingtip includes a continuously curving planar member that extends aft of a trailing edge of the wing and substantially in the same plane as the wing.

According to another embodiment, a curved wingtip for a wing of an aircraft is provided. The curved wingtip includes a continuously curving member that extends aft of a trailing edge of the wing to form a tip oriented upwardly above a top surface of the wing.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
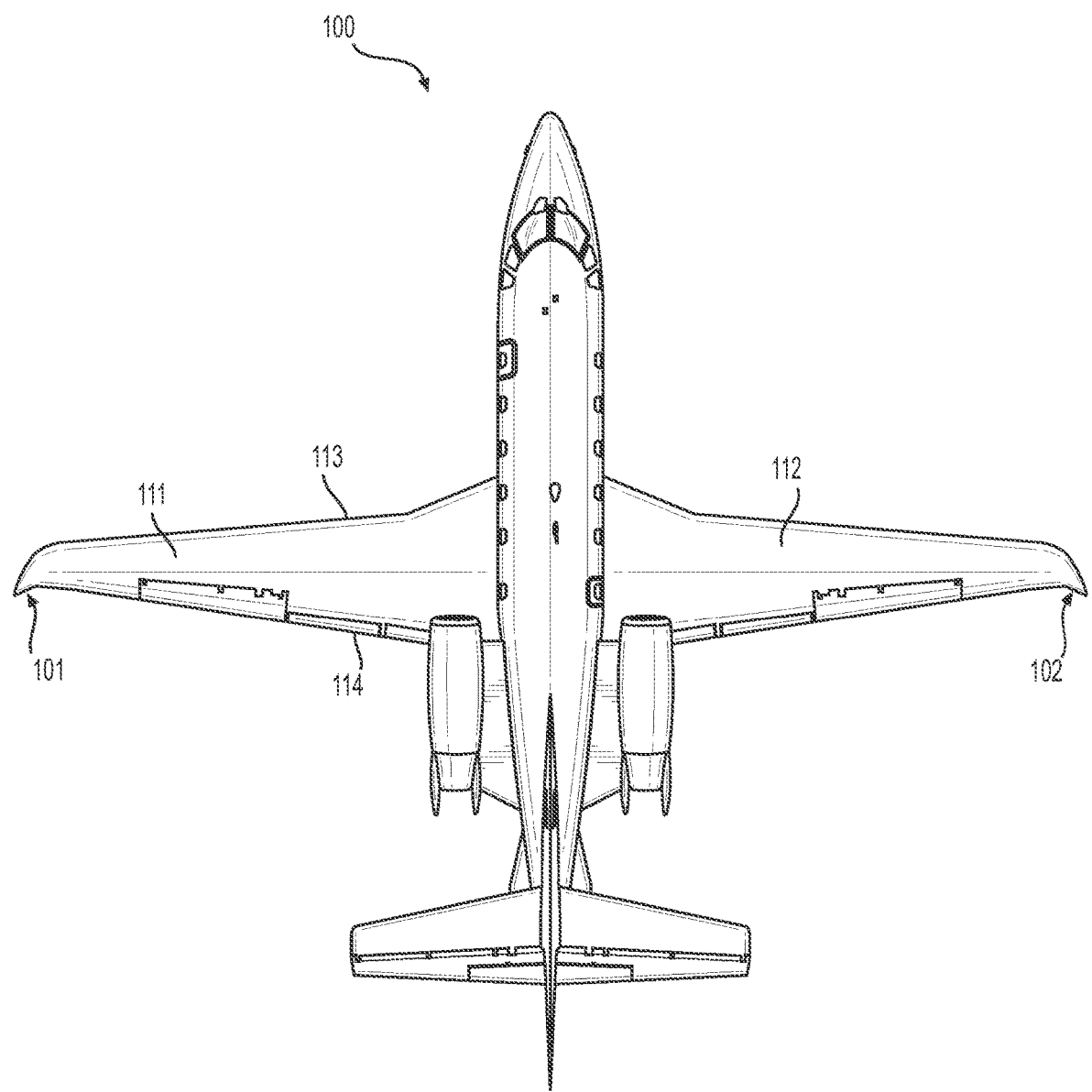
FIG. 1 is a top-down view of an exemplary aircraft having curved planar wingtips on the ends of straight wings, in an embodiment.
Figure 2:
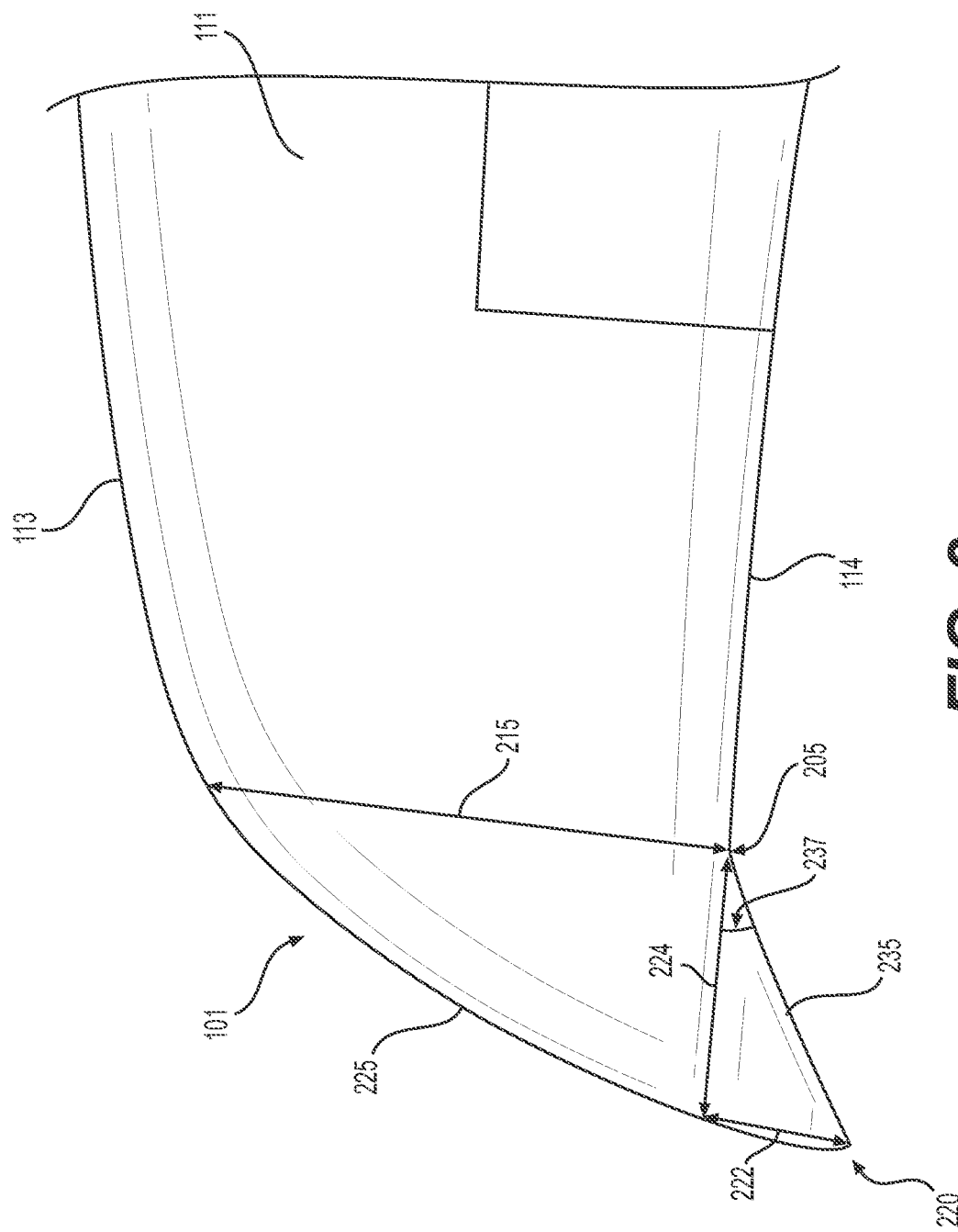
FIG. 2 is a close-up view of a curved planar wingtip on the end of a straight wing, in an embodiment.
Figure 6:
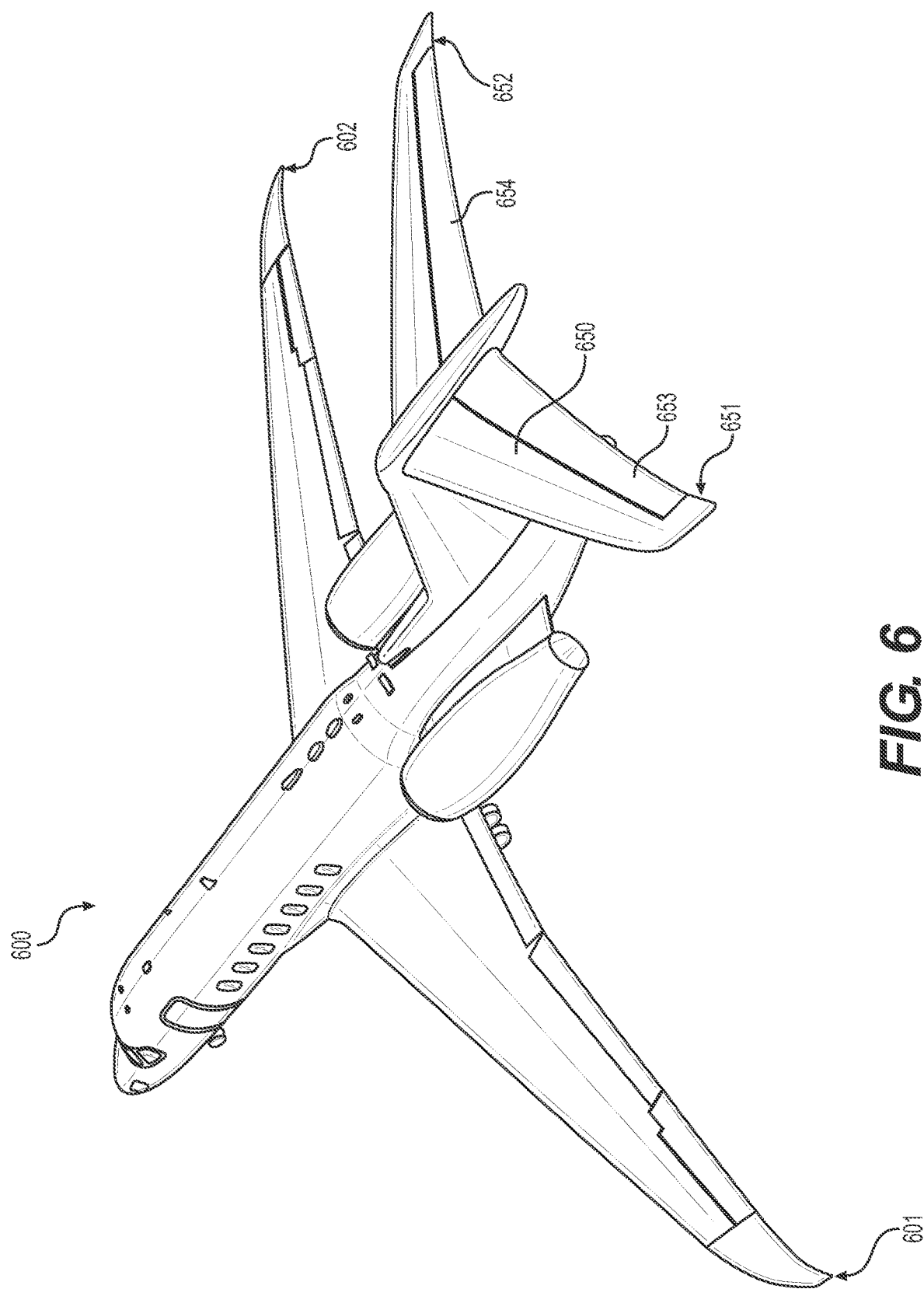
FIG. 6 is a perspective view of an exemplary aircraft having a horizontal tail with one embodiment of curved planar wingtips.
Figure 7:
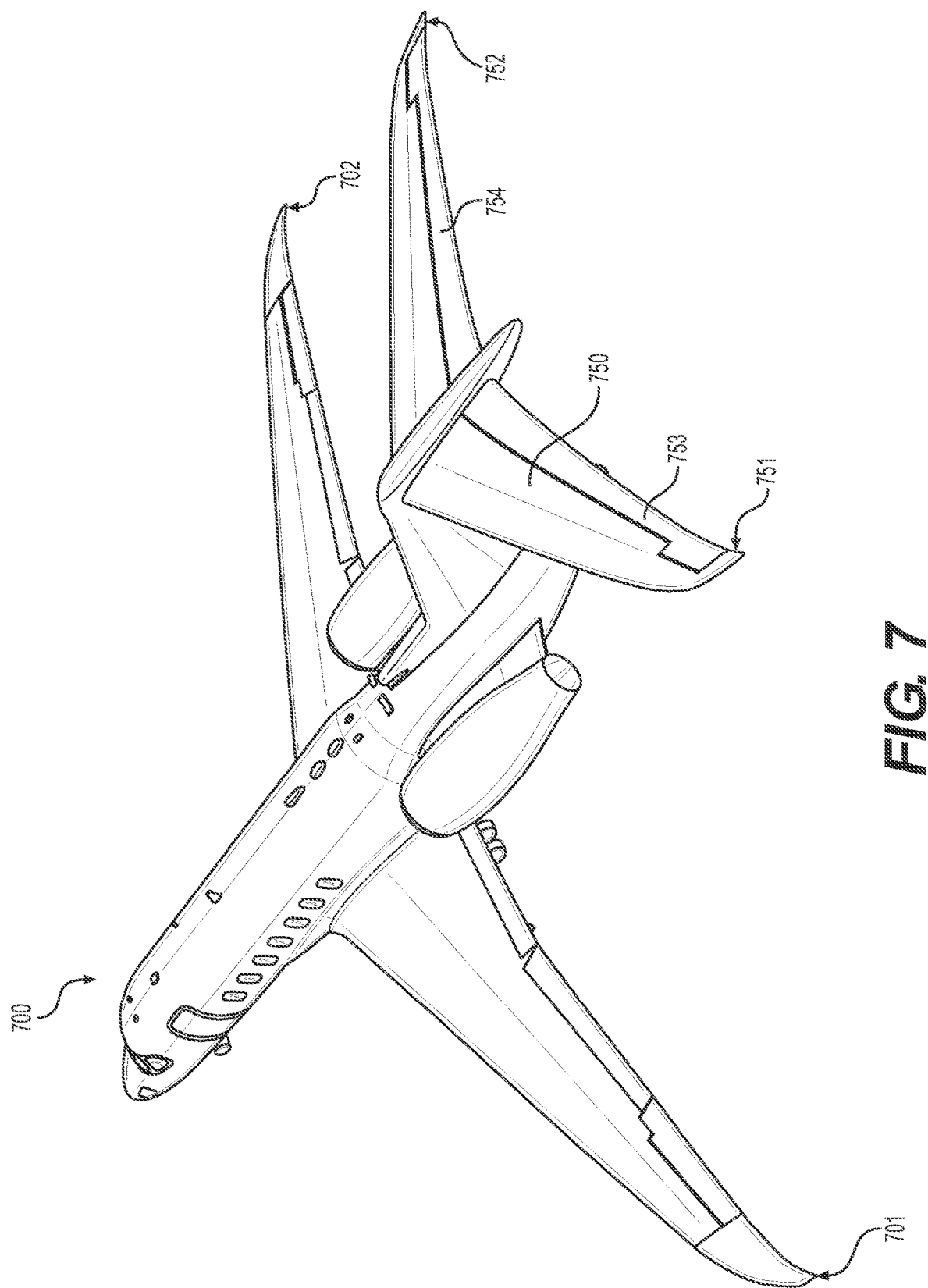
FIG. 7 is a perspective view of an exemplary aircraft having a horizontal tail with another embodiment of curved planar wingtips.
Figure 8:
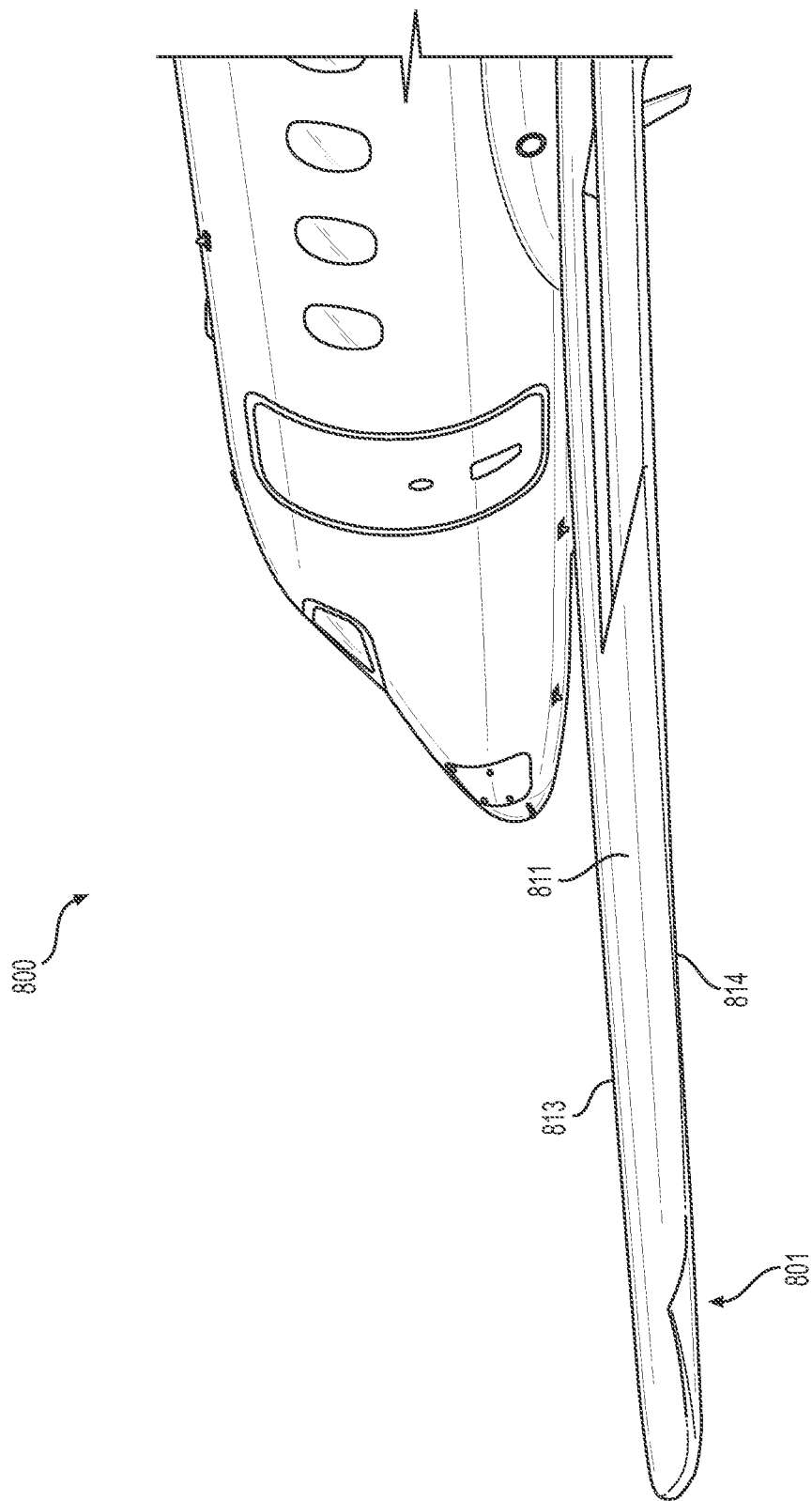
FIG. 8 is a perspective view of an exemplary wing having a curved wingtip, in an embodiment.
Figure 9:
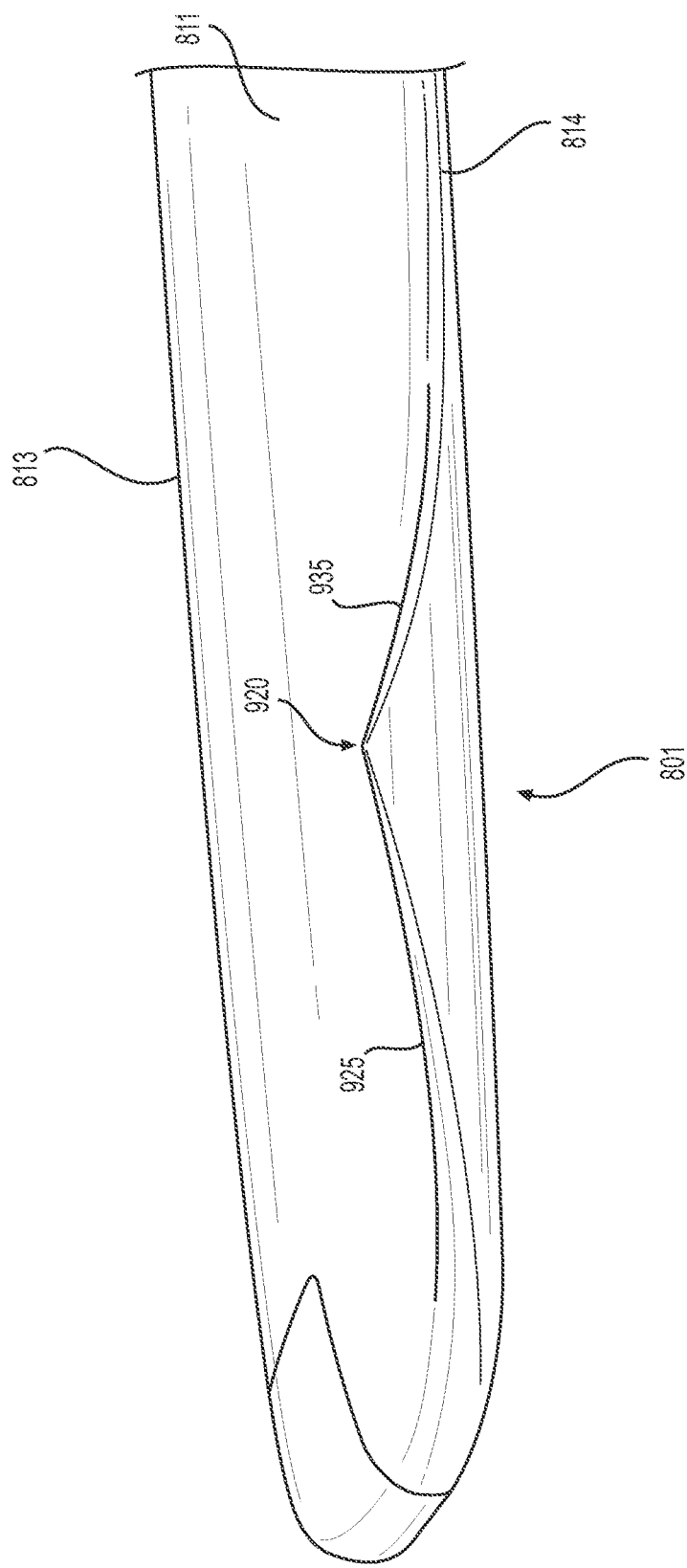
FIG. 9 is a close-up view of the curved wingtip of FIG. 8.

Embodiments of the present disclosure provide extensions for the end or tip of an aircraft wing. The extensions curve in an aft direction (e.g., towards the tail of the aircraft) while remaining substantially in the same plane as the aircraft wing. In other words, the curved planar wingtips do not curve substantially upwards like a winglet. The term "aircraft wing" in this disclosure is intended to include any aerodynamic lifting body or stabilizer of an aircraft. For example, wings may include a main wing of the aircraft, as well as a horizontal stabilizer (e.g., horizontal tail) and a vertical stabilizer (e.g., vertical tail). The attached drawing figures depict various embodiments. For example, FIGS. 1 and 2 show a curved planar wingtip for a straight wing; FIGS. 3-7 show a curved planar wingtip for a swept wing; FIGS. 6 and 7 further show a curved planar wingtip for a horizontal tail; and, FIGS. 8 and 9 show an alternative embodiment of a curved wingtip.

FIG. 1 is a top-down view of an exemplary aircraft 101 having curved planar wingtips on the ends of straight wings. Examples of straight wings are wings that extend substantially perpendicular to the fuselage. A port-side straight wing 111 includes wingtip 101 and a starboard-side straight wing 112 includes a wingtip 102, which is a mirror image of wingtip 101. The curved planar wingtips 101, 102 sweep from a leading edge of their respective straight wing 111, 112 in an aft direction (e.g., towards the tail of the aircraft). For example, wingtip 101 curves from a leading edge 113 at the fore of wing 111 to a point aft of a trailing edge 114 at the aft of wing 111, as further described below in connection with FIG. 2.

FIG. 2 is a close-up view of wingtip 101 on an end of straight wing 111, FIG. 1. Curved planar wingtip 101 is a member that extends from the end of wing 111 with a sweeping shape in an outboard and aft direction. Drag created by wing 111, which is known as "induced" drag, is reduced by curved planar wingtip 101 without substantially increasing lift or weight.

Wingtip 101 includes an outboard edge 225 and an inboard edge 235 that extend to form a tip 220 located aft of trailing edge 114. In an embodiment, tip 220 extends aft of trailing edge 114 by a distance 222, which is at least ten percent of a tip chord 215 of wing 111. A span 224 of wingtip 101 may be determined based on a structural load capacity of wing 111 among other factors. In an embodiment, span 224 of wingtip 101 is at least twice the distance 222 that tip 220 extends aft of trailing edge 114. Tip 220 may be pointed or rounded without departing from the scope hereof.

Outboard edge 225 extends from leading edge 113, and inboard edge 235 extends from trailing edge 114. Outboard edge 225 and inboard edge 235 curve continuously from wing 111 to tip 220 with finite radii providing in-plane sweep from the end of straight wing 111. In certain embodiments, the continuous curvature of outboard edge 225 and inboard edge 235 have elliptical or circular radii. Outboard edge 225 may follow a complex curve with a smaller radius of curvature near leading edge 113 and a gradually increasing radius of curvature as leading edge 225 curves aft towards tip 220. In an embodiment, inboard edge 235 angles aft of trailing edge 114 from a wing/wingtip interface 205 by a trailing-edge sweep angle 237 of approximately twenty degrees with a line tangent to the curve of inboard edge 235. Curved planar wingtip 101 may include navigational lights, such as light-emitting diodes (LEDs) for example, embedded within outboard edge 225 and/or inboard edge 235.

Curved planar wingtip 101 is substantially planar with respect to wing 111 in contrast to winglets, which curve substantially upward from the wing surface. Because curved planar wingtip 101 does not curve substantially upward from the wing surface, exposure of the wing to additional aerodynamic loads is avoided, especially due to cross-winds. This is an important consideration for retrofitting existing wings that may not be designed to withstand additional loads. Similarly, the wingspan, lift, and weight of wing 111 are not substantially increased by curved planar wingtip 101, thus avoiding additional loads to wing 111 due to a longer wingspan, increased lift, or heavier weight.

Figure 3:
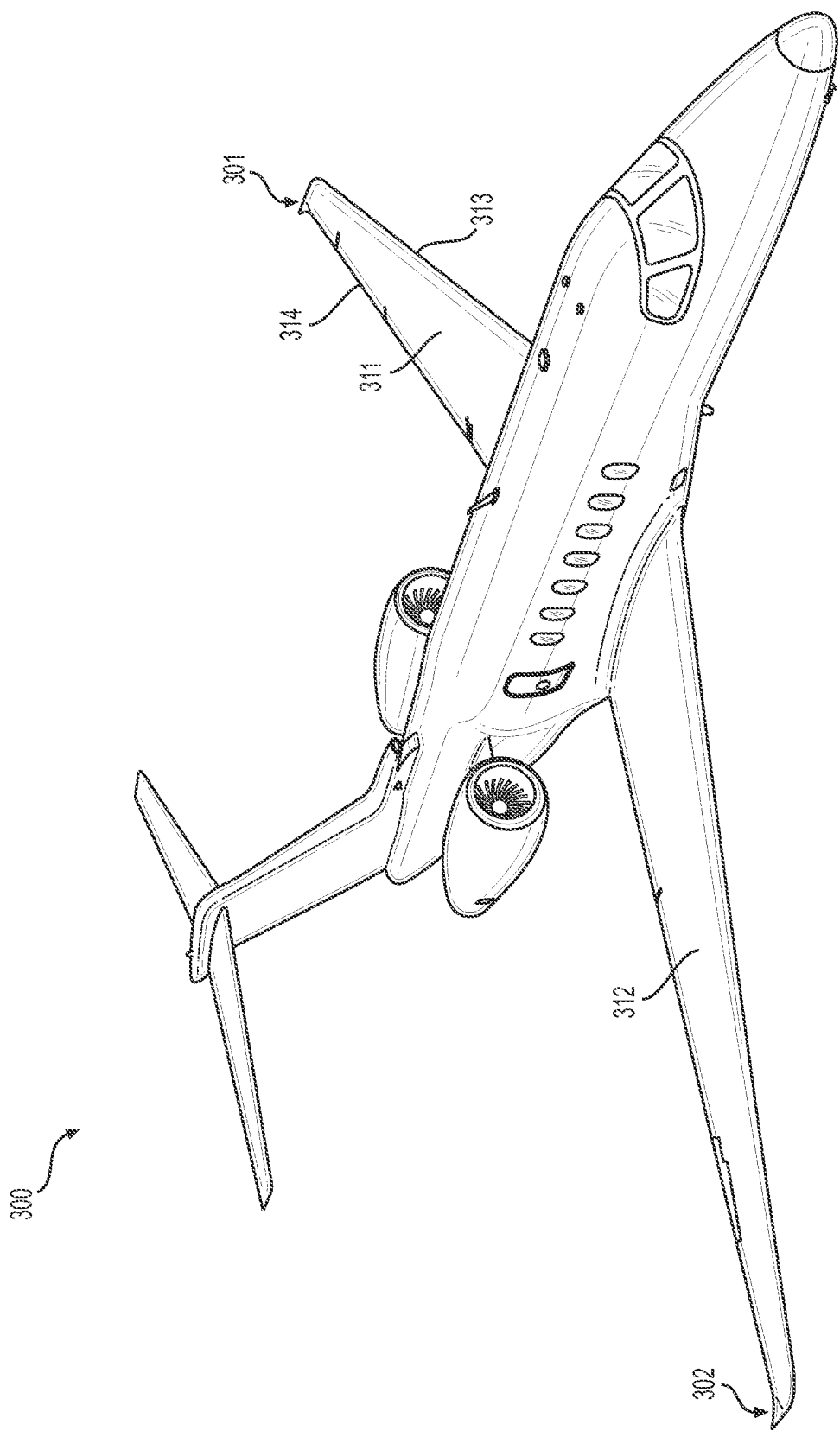
FIG. 3 is a perspective view of an exemplary aircraft having swept wings with curved planar wingtips, in an embodiment.
Figure 4:
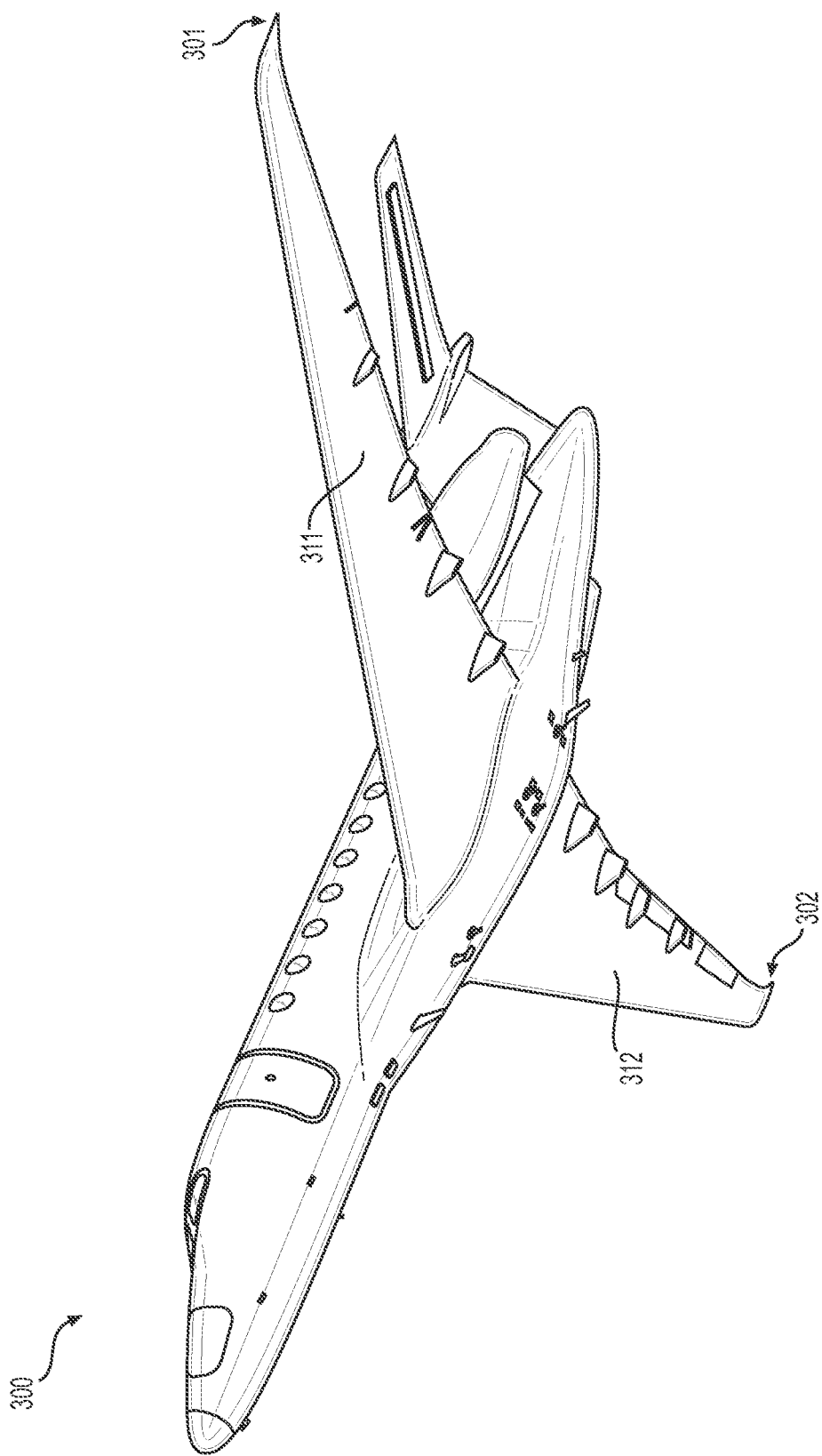
FIG. 4 is another perspective view of the aircraft of FIG. 3.

FIGS. 3 and 4 provide different perspective views of an exemplary aircraft 300 with swept wings having curved planar wingtips 301, 302, which are examples of curved planar wingtips 101, 102 of FIG. 1. A port-side wing 311 includes curved planar wingtip 301, and a starboard-side wing 312 includes a curved planar wingtip 302, which is a mirror image of wingtip 301. Wingtips 301, 302 are configured for swept-back wings, such as wings 311, 312, which have a sweep angle that orients the wings back towards the tail of the aircraft. For example, swept wing 311 includes a leading edge 313 and a trailing edge 314 that are both angled in an aft direction, or "swept back", with respect to the aircraft fuselage. Note that curved planar wingtips 301, 302 do not curve upward, but instead remain substantially in plane with the wing. In other words, there is no planar portion of the wingtip facing outboard from the aircraft that would substantially expose the wingtip to cross-winds.

Figure 5:
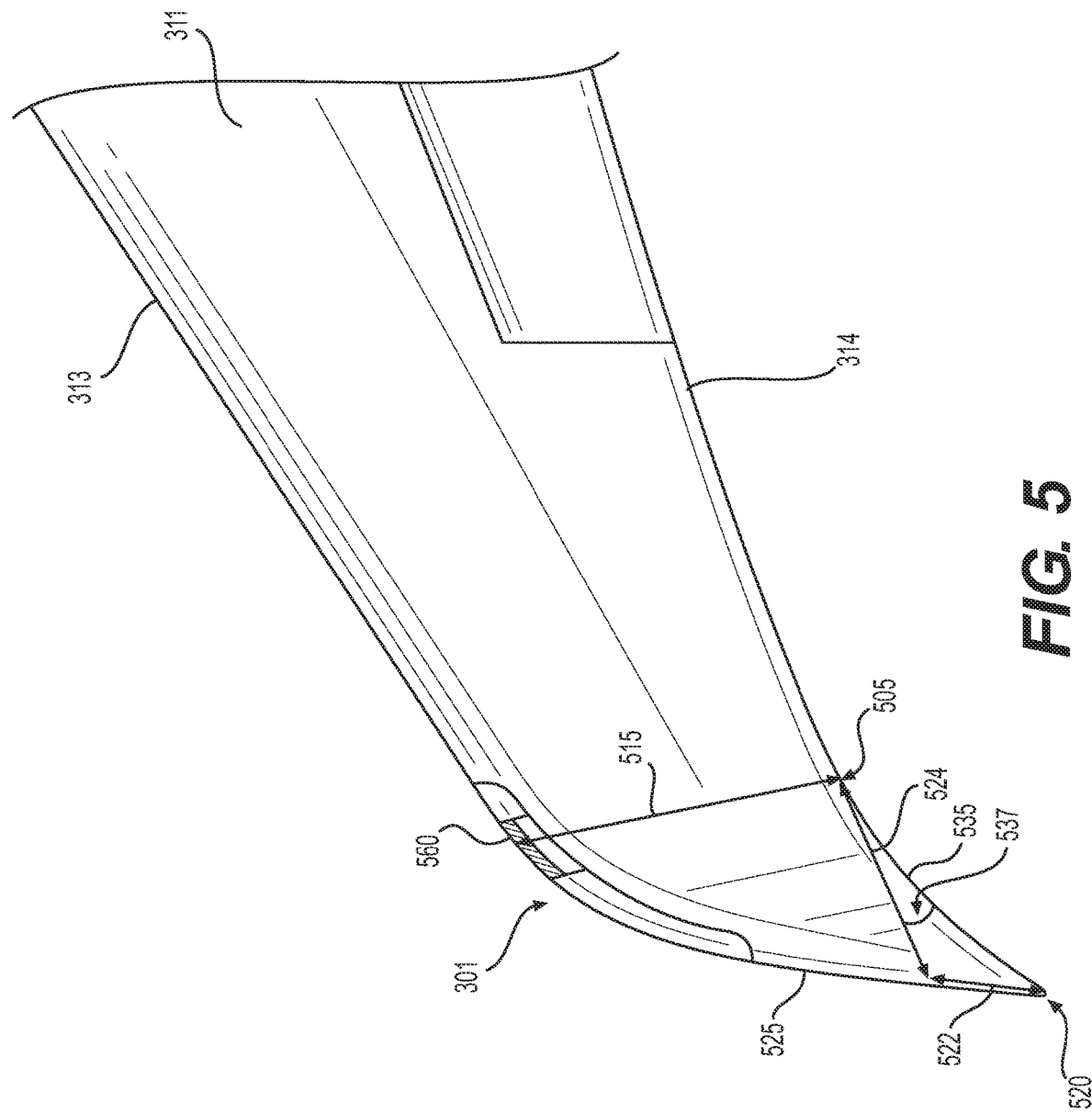
FIG. 5 is a close-up view of a curved planar wingtip on the end of a swept wing, in an embodiment.

FIG. 5 is a top-down view of curved planar wingtip 301 of FIGS. 3 and 4. Curved planar wingtip 301 includes a member that extends swept wing 311 in an outboard and aft direction. The member may form a tip 520 located aft of trailing edge 314. In an embodiment, tip 520 extends aft of trailing edge 314 by a distance 522 of at least ten percent of a tip chord 515 of wing 311. A span 524 of wingtip 301 is determined by a structural load capacity of wing 311. In an embodiment, span 524 of wingtip 301 is at least twice that of distance 522 that tip 520 extends aft of trailing edge 314. Tip 520 may be pointed or rounded without departing from the scope hereof.

An inboard edge 535 of curved planar wingtip 301 extends aft from the trailing edge 314 to tip 520. Likewise, an outboard edge 525 of swept wing 311 extends aft from leading edge 313 to tip 520. Outboard edge 525 and inboard edge 535 curve continuously with finite radii providing in-plane sweep from the end of swept wing 311. In certain embodiments, the continuous curvature of outboard edge 525 and inboard edge 535 have elliptical or circular radii. Outboard edge 525 may follow a complex curve with a smaller radius of curvature near leading edge 313 and a gradually increasing radius of curvature as outboard edge 525 curves aft towards tip 520. In an embodiment, inboard edge 535 extends from trailing edge 314 at a wing/wingtip interface 505 and curves aft by an angle greater than the sweep angle of swept wing 311. For example, a trailing-edge sweep angle 537 is about twenty degrees greater than the sweep angle of swept wing 311. Outboard edge 525 and/or inboard edge 535 may include embedded navigational lights, such as navigational lights 560 depicted in FIG. 5, which may include light-emitting diodes for example.

Similar to curved planar wingtip 101, FIG. 1, curved planar wingtip 301 is substantially planar with respect to wing 311 in contrast to winglets, which curve substantially upward from the wing surface. Because wingtip 301 is substantially planar with wing 311, exposure to additional aerodynamic loads is avoided, especially due to cross winds. Curved planar wingtip 301 also does not substantially increase lift, wingspan, or weight of wing 311, while at the same time reducing induced drag.

FIG. 6 is a perspective view of an exemplary aircraft 600 having a horizontal tail 650 with a port-side curved planar wingtip 651 and a starboard-side curved planar wingtip 652. Aircraft 600 includes curved planar wingtips 601, 602 on the aircraft's swept wings, which are examples of wingtips 301, 302. The outboard and inboard edges of wingtips 651, 652 curve continuously with finite radii from horizontal tail 650 to a tip, providing in-plane sweep aft of horizontal tail 650. Similar to curved planar wingtip 101, wingtips 651, 652 may include navigational lights, such as LEDs, embedded within their outboard and/or inboard edge. Wingtips 651, 652 extend around the outboard edge of a port-side elevator 653 and a starboard-side elevator 654, respectively.

FIG. 7 is a perspective view of an exemplary aircraft 700 having a horizontal tail 750 with curved planar wingtips 751, 752, which are an alternative embodiment of wingtips 651, 652. Aircraft 700 includes curved planar wingtips 701, 702 on the aircraft's swept wings, which are examples of wingtips 301, 302. The outboard and inboard edges of wingtips 751, 752 curve continuously with finite radii from horizontal tail 750 to a tip, providing in-plane sweep aft of horizontal tail 750. Similar to curved planar wingtip 101, wingtips 751, 752 may include navigational lights, such as LEDs, embedded within their outboard and/or inboard edge. Wingtips 751, 752 extend around the outboard edge of elevators 753, 754, respectively.

Curved planar wingtips may be attached to other aerodynamic surfaces of an aircraft in addition to straight wings, swept wings, and the horizontal tail. For example, curved planar wingtips may be attached to the trailing edge of a vertical stabilizer (not shown), without departing from the scope hereof. A vertical stabilizer wingtip may curve continuously with finite radii upwards towards the top of the vertical stabilizer, for example.

FIG. 8 is a perspective view of an aircraft 800 with wing 811 and curved wingtip 801 attached thereto. FIG. 9 is a close-up view of curved wingtip 801, FIG. 8. Curved wingtip 801 may be adapted to extend from a straight wing, such as wing 111, FIG. 1 or a swept wing, such as wing 311, FIG. 3. FIGS. 8 and 9 are best viewed together with the following description.

Wing 811 includes a leading edge 813 and a trailing edge 814. Curved wingtip 801 includes a member having an inboard edge 935 that extends aft from trailing edge 814 to a tip 920, and an outboard edge 925 that extends aft from leading edge 813 to tip 920. Tip 920 may be pointed or rounded without departing from the scope hereof. Outboard edge 925 and/or inboard edge 935 may include embedded navigational lights, such as light-emitting diodes for example.

In an embodiment, inboard edge 935 and outboard edge 925 extend aft and above wing 811 to form tip 920, such that tip 920 is oriented upwardly. In other words, tip 920 may point in an upwards direction above a top surface of the wing. Specifically, curved wingtip 801 extends aft of wing 811 before curving upwardly above the top surface of wing 811. Thus, unlike curved planar wingtip 101 of FIGS. 1 and 2, wingtip 801 curves out of the same plane as wing 811 as the curved member reaches tip 920; however, most of wingtip 801 remains substantially planar with respect to wing 811, especially when compared to a winglet. Although tip 920 points upwardly, curved wingtip 801 does not include an outboard-facing planar surface like a winglet. Tip 920 is located above the top surface of wing 811 by a first distance, and tip 920 is located aft of wing trailing edge 814 by a second distance. In an embodiment, the first distance is less than the second distance. In an alternative embodiment, the first distance of tip 920 above the top surface of wing 811 is no more than one quarter of a span of wingtip 801.

Induced drag of wing 811 is reduced by curved wingtip 801 without substantially increasing lift. Since curved wingtip 801 curves upwardly from the wing surface substantially less than a winglet, and wingtip 801 does not include an outboard-facing planar surface like a winglet, wingtip 801 avoids exposing wing 811 to substantial additional loads, especially due to cross-winds. Similarly, wingtip 801 does not substantially add wingspan or weight to wing 811, thus avoiding additional loads caused by a longer wingspan or heavier weight.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims.

What is claimed:

1. A curved planar wingtip, comprising:
a stationary wingtip attached to an outboard end of a wing of an aircraft,
wherein the stationary wingtip has a continuously curving planar member that extends aft of a trailing edge of the wing to form a tip;
the tip is substantially in the same plane as the wing without extending substantially upwardly or downwardly with respect to the wing;
wherein the stationary wingtip comprises:
an outboard edge that curves continuously with a finite radius of curvature from a wing leading edge to the tip;
an inboard edge that curves continuously with a finite radius of curvature from a wing trailing edge to the tip;
wherein the outboard edge and the inboard edge come together at the tip such that the tip is substantially pointed; and
wherein the outboard edge has a smaller radius of curvature near the wing leading edge and a gradually increasing radius of curvature as the outboard edge curves aft towards the tip; and
a span of the wingtip is at least twice the distance that the tip extends aft of the trailing edge.

2. The curved planar wingtip of claim 1, wherein the tip extends aft of the trailing edge of the wing by a distance of at least ten percent of a tip chord of the wing.

3. The curved planar wingtip of claim 1, wherein the induced drag of the wing is reduced by the curved planar wingtip without substantially increasing the lift of the wing and without substantially increasing the weight of the wing.

4. The curved planar wingtip of claim 1, wherein the curved planar wingtip avoids applying substantial additional loads to the wing due to cross winds.

5. The curved planar wingtip of claim 1, wherein the wing is a straight wing of the aircraft and the curved planar wingtip is substantially planar with the straight wing.

6. The curved planar wingtip of claim 1, wherein the wing is a horizontal tail of the aircraft and the curved planar wingtip is substantially planar with the horizontal tail.

7. The curved planar wingtip of claim 1, wherein the wing is a vertical tail of the aircraft and the curved planar wingtip is substantially planar with the vertical tail.

8. The curved planar wingtip of claim 1, wherein the outboard edge and the inboard edge each curve continuously with elliptical radii to provide in-plane sweep from an end of the wing.

9. The curved planar wingtip of claim 8, wherein the inboard edge angles aft of the trailing edge by an angle of twenty degrees with a line tangent to the curve of the inboard edge.

10. The curved planar wingtip of claim 8, wherein the outboard edge comprises embedded navigational lights.

11. The curved planar wingtip of claim 1, wherein the wing is a swept wing of the aircraft and the curved planar wingtip is substantially planar with the swept wing.

12. The curved planar wingtip of claim 11, wherein the inboard edge extends in an aft direction from the trailing edge at an interface by an angle greater than a sweep angle of the swept wing.

13. The curved planar wingtip of claim 12, wherein a trailing-edge sweep angle is twenty degrees greater than the sweep angle of the swept wing.

14. An aerodynamic device comprising:
a wingtip adapted to be either: fixed to an outboard end of an aircraft wing, or made to be integral with the wing, such that the wingtip provides a stationary extension from the outboard end of the aircraft wing;
the wingtip having a continuously curving planar portion that extends aft of a trailing edge of the wing, wherein the continuously curving planar portion forms a substantially pointed tip that is substantially in the same plane as the wing without extending substantially upwardly or downwardly;
the wingtip has an inboard edge that angles aft of the trailing edge of the wing by an angle of twenty degrees with a line tangent to the curve of the inboard edge; and
the wingtip has an outboard edge with a smaller radius of curvature near the wing and a gradually increasing radius of curvature as the outboard edge curves aft towards the tip.

* * * * *